US00H002117H

(19) United States

(12) Statutory Invention Registration

Pasquale et al.

(10) Reg. No.: US H2117 H

(43) Published: May 3, 2005

(54) RAMP BLANKET

(75) Inventors: Jeffrey Pasquale, Lancaster, CA (US); Robert Reyes, California City, CA (US); Robert E. Lavery, Edwards, CA (US); Greg Lawniczak, California City, CA (US)

(73) Assignee: The United States of America as represented by the Secretary of the Air Force, Washington, DC (US)

(21) Appl. No.: 09/907,891

(22) Filed: Jul. 13, 2001

(51) Int. Cl.[7] ..... G03B 42/04

(52) U.S. Cl. ..... 378/174

(58) Field of Search ..... 378/58, 59, 174, 378/172, 173, 167

(56) References Cited

U.S. PATENT DOCUMENTS 3,774,045 A * 11/1973 Trott ..... 378/174

* cited by examiner

*Primary Examiner*—Daniel Pihulic

(74) *Attorney, Agent, or Firm*—William G Auton

(57) ABSTRACT

Vari ramp blankets holding X-ray file, 14" by 17" in dimensions, in pockets on top of the vari-ramp inlets on an F-15 aircraft have been used by us for the detection of foreign objects, i.e. washers, bolts, safety wire. These blankets ensure inspection consistency each and every time the aircraft is X-rayed when it is grounded after flight or is in phase. The blankets are placed on top of the F-15 vari-ramp, taped securely in place and film is placed individually in the pockets. The placement and the consistency of results that the blankets provide enhances the accuracy and duplicability of the overall X-ray process.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RAMP BLANKET

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to aircraft inspection systems and more specifically to a vari ramp blanket of pockets for X-ray film for consistent X-ray inspection of an aircraft.

Aircraft structures and parts are commonly X-rayed to ascertain structural integrity. Samples of X-ray inspection systems are described in the following U.S. Patents, the disclosures of which are specifically incorporated herein by reference:

U.S. Pat. No. 4,685,966, Aug. 11, 1987, Surface tracking apparatus, Garner, Gerald D.

U.S. Pat. No. 4,408,340, Oct. 4, 1983, Means for holding X-ray films, Bauer.

U.S. Pat. No. 3,737,661, Jun. 5, 1973, Portable X-ray Radiation Shielding Device, Applegate, Robert L.

While the above-cited references are instructive, a need remains to ensure inspection consistency each and every time an aircraft is X-rayed. The present invention is intended to satisfy that need.

SUMMARY OF THE INVENTION

Vari ramp blankets holding X-ray film, 14" by 17" in dimensions, in pockets on top of the vari-ramp inlets of an F-15 aircraft have been used by us for the detection of foreign objects, i.e. washers, bolts, safety wire. These blankets ensure inspection consistency each and every time the aircraft is X-rayed when it is grounded after flight or is in phase. The blankets are placed on top of the F-15 vari-ramp, taped securely in place and film is placed individually in the pockets. The placement and the consistency of results that the blankets provide enhances the accuracy and duplicability of the overall X-ray process. They also reduce training time for inspection technicians as their use is easily taught. The use of these blankets is a very straightforward inspection method and one can easily see how they are placed on an aircraft.

The blankets have been shown to ensure reliability and consistency in aircraft inspection methods. After film processing, each prior film slide can be easily compared with the new X-ray slides of the same area. As for, detection of foreign objects, it is easier to identify the location of such objects in that each film package with the proper numbering can be easily located, retrieved and compared. The blankets are 12 feet 4 inches long and 2 feet 9½ inches wide to accommodate 14 inch by 17 inch film, and they hold such film securely in specific locations about the blanket surface by means of "pockets" sewn into the blanket material.

DESCRIPTION OF THE PREFERRED EMBODIMENT

Figure 1:
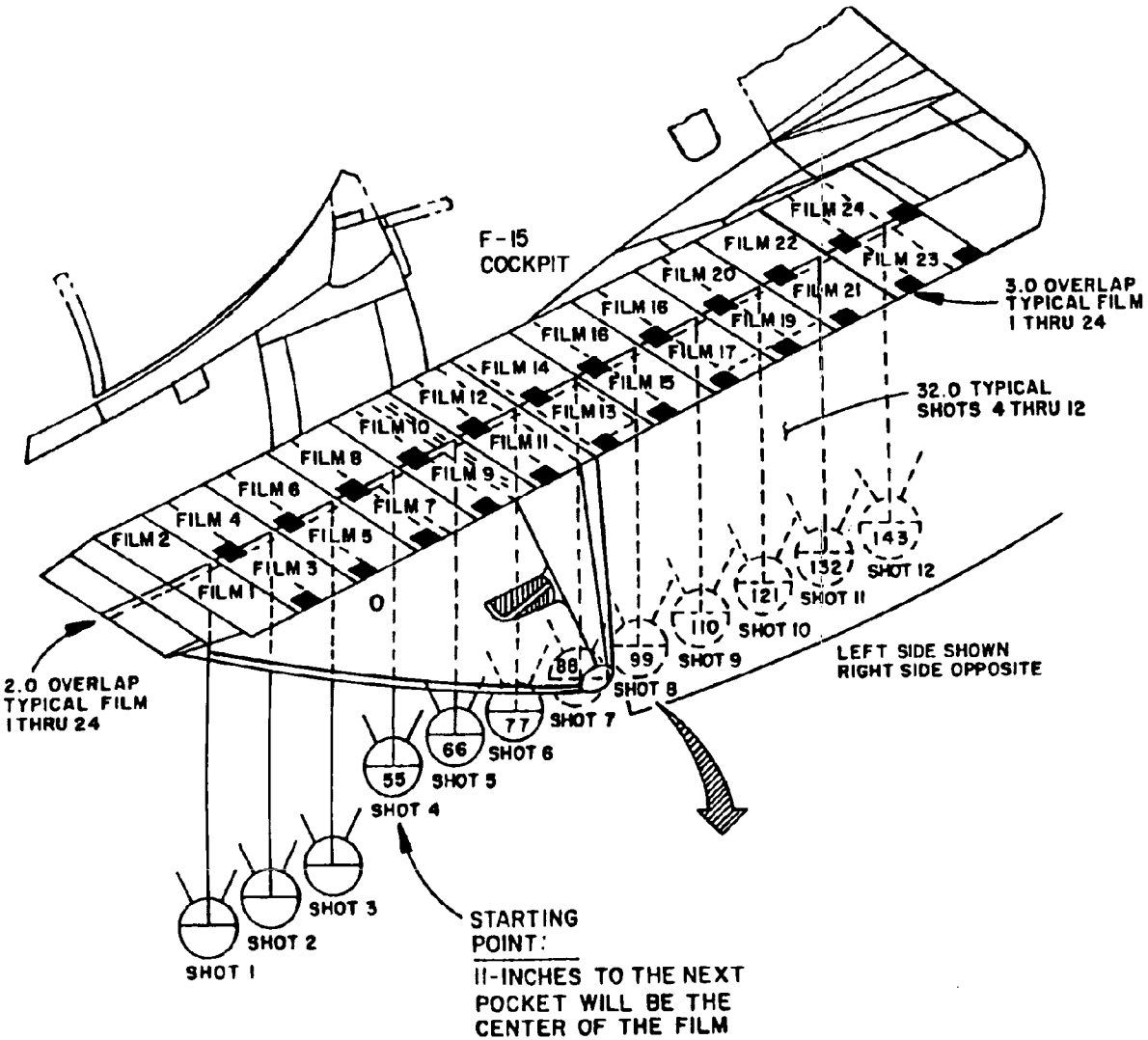
FIGS. 1 through 3 are views of the Variable Air Inlet Ramp Assembly used for inspection for foreign objects on aircraft.

The present invention is a blanket fabrication that serves as a multi-frame X-ray film holder that is used to hold a plurality of 14 inch by 17 inch X-ray films in place in predetermined locations on an aircraft while the aircraft structure is being inspected by X-rays for flaws, cracks and foreign objects. The reader's attention is directed towards FIG. 1, which shows the use of the blanket in the variable Air inlet Assembly in inspection for foreign objects. As shown in FIG. 1, a total of 24 X-ray films are held in place by a blanket frame the way frames of glass are held in picture window. After the film slides are placed in individual pockets, the blanket is placed in a predetermined position to hold the set of film slides in place for tests and retests, then the films are reviewed and compared for the detection of abnormalities and defects in or on the aircraft so scanned. Note that the basic idea of this invention is not limited to aircraft but may be used on any object of interest.

Many variations of the present invention are possible, but in one embodiment the basic process of making a ramp blanket has the following five fabrication steps.

Step 1. Roll out 12 feet 4 inches in length and 33⅞ inches in width of Blue "Herculite" or Blue Vinyl on a table or other flat surface sufficiency large enough to accommodate the piece to be worked upon.

Step 2. Construct a lip on the under side of the sheet to hook to the leading edge of the Vari Ramp itself by folding and sewing the larger sheet. The actual lip that we used was 7¾ inches wide with only the sides sewn in.

Step 3. Forty eight inches or 4 feet from the leading edge, make a first pocket on the top side of the sheet. Sew 3 sides closed, leaving room for the placement of the film inside the actual pocket. The pocket may be made by placing a vinyl cut-out on the sheet and sewing it on or using any other slide-holding techniques currently in use.

Step 4. Measure down 11½ inches from the bottom of the first pocket and succeeding higher pockets to the bottom of the next and lower pocket, so that this and the 9 subsequent pockets from a column 12 feet 4 inches in length. Refer to FIG. 1. Repeat this sewing process to produce as many columns of pockets on the surface of each blanket as desired. One way to envision making this pattern on the blanket is that there must be some small space between the pockets not one or more slides, so the film (7½ inches) can protrude.

Step 5. Place a piece of 14 inch by 17 inch piece of Kodak AA film inside each pocket so constructed to ensure that approximately 7½ inches of film are being shown. Once this has been done, the Vari Ramp blankets are ready for use on the aircraft Vari Ramp to detect the presence of foreign objects.

Figure 2:
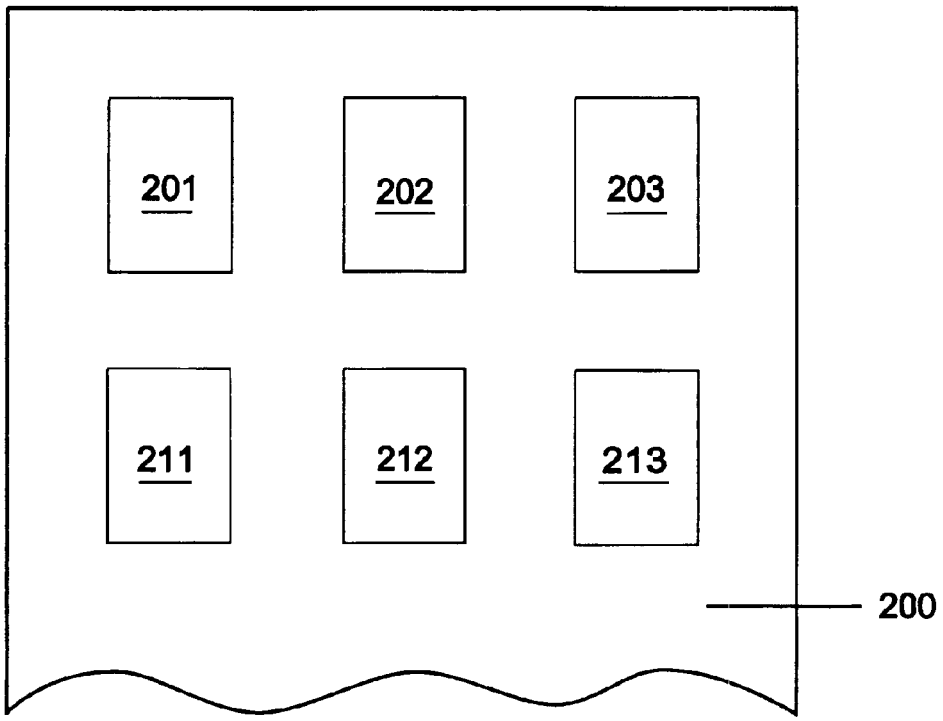

FIG. 2 shows the invention as a blanket frame (200) for holding a plurality of blank X-ray slides in predetermined positions when performing X-rays from multiple views upon an object of interest. The blanket frame (200) includes a rectangular blanket frame which contains rows and columns of aperture pockets (201–213), into each of which one of the blank X-ray slides may be placed. This rectangular blanket frame has an external geometry to be placed on the object of interest such that each of the aperture pockets positions on of the blank X-ray slides in precise area of interest on the object of interest. The object of interest need not be an aircraft. And the distribution of aperture pockets need not be in linear rows and columns, but only a distribution such that the X-ray slide is over an area of interest.

Figure 3:
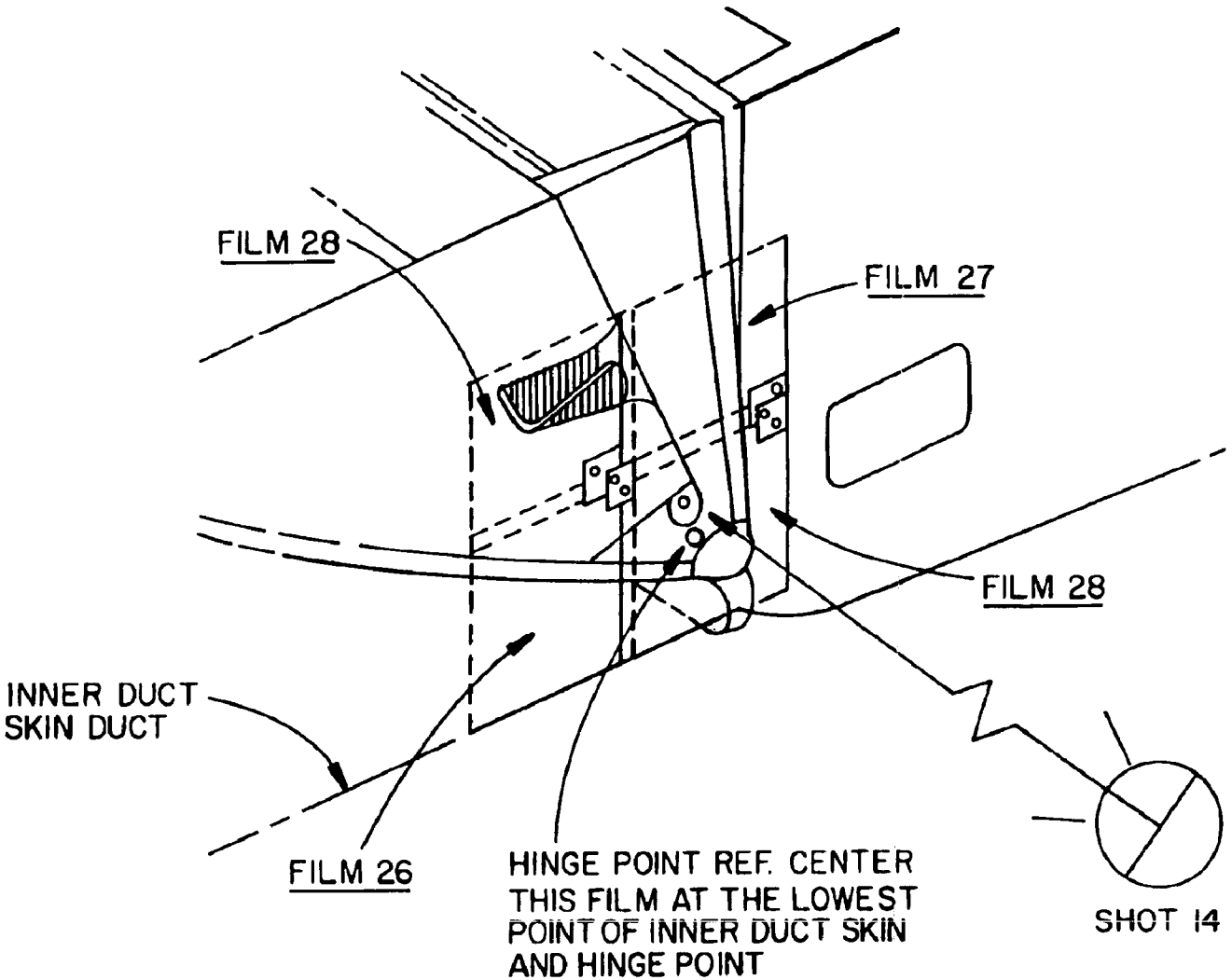

FIG. 3 shows that the blanket need not be planar, but may have a hinged joint to "wrap around" the object of interest.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A blanket frame for holding a plurality of blank X-ray slides predetermined positions when performing X-rays from multiple views upon an object of interest, said blanket frame comprising:

a rectangular blanket frame which contains rows and columns of aperture products into each of which one of the blank X-ray slides may be placed, said rectangular blanket frame having an external geometry, to be placed on the object of interest such that each of the aperture pocket positions one of the blank X-ray slides in a precise area of interest on the object of interest.

2. A blanket frame, as defined in claim 1, further including hinged joints that allow the X-ray slides to be placed in a non-planar distribution about the object of interest.

3. A blanket frame for holding a plurality of blank X-ray slides in predetermined positions when performing X-rays from multiple views upon an object of interest, said blanket frame comprising:

a blanket frame which contains a geometrically spaced distribution of aperture pockets into each of which one of the blank X-ray slides may be placed, said blanket frame having an external geometry to be placed on the object of interest such that each of the aperture pockets positions one of the blank X-ray slides in a precise area of interest on the object of interest.

4. A blanket frame, as defined in claim 3, further including hinged joints that allow the X-ray slides to be placed in a non-planar distribution about the object of interest.

* * * * *